United States Patent
Marchart et al.

(10) Patent No.: US 6,881,238 B2
(45) Date of Patent: Apr. 19, 2005

(54) HOUSING FOR RECEIVING AN AIR FILTER ELEMENT

(75) Inventors: Udo Marchart, Grossbuttwar (DE); Ralf Ziegler, Ludwigsburg (DE); Peter Erlewein, Neckarsulm (DE); Wolfgang Banscher, Leingarten (DE)

(73) Assignee: Audi AG (DE)

( * ) Notice: Subject to any disclaimer, the term of this patent is extended or adjusted under 35 U.S.C. 154(b) by 0 days.

(21) Appl. No.: 10/398,378

(22) PCT Filed: Sep. 28, 2001

(86) PCT No.: PCT/EP01/11237

§ 371 (c)(1),
(2), (4) Date: Sep. 8, 2003

(87) PCT Pub. No.: WO02/31339

PCT Pub. Date: Apr. 18, 2002

(65) Prior Publication Data

US 2004/0025484 A1 Feb. 12, 2004

(51) Int. Cl.$^7$ ............................................. B01D 46/00
(52) U.S. Cl. ........................ 55/495; 55/337; 55/385.3; 55/498; 55/502; 55/510; 55/521; 55/482; 123/198 E
(58) Field of Search ................. 55/385.3, 482, 55/498, 495, 502, 510, 521, 506; 123/198 E

(56) References Cited

U.S. PATENT DOCUMENTS

| | | | |
|---|---|---|---|
| 2,480,379 A | 8/1949 | Newberry | |
| 4,020,783 A | 5/1977 | Anderson et al. | |
| 4,419,112 A | 12/1983 | Kawamura | |
| 4,605,426 A | 8/1986 | Thornburgh | |
| 4,802,902 A | 2/1989 | Bauerle et al. | |
| 5,730,769 A | * 3/1998 | Dungs et al. | 55/385.3 |
| 5,893,937 A | 4/1999 | Moessinger | |
| 6,152,979 A | * 11/2000 | Cappuyns | 55/385.3 |
| 6,312,491 B1 | * 11/2001 | Coulonvaux | 55/498 |
| 6,322,602 B1 | * 11/2001 | Engel et al. | 55/428 |
| 6,447,567 B1 | * 9/2002 | Ehrenberg | 55/498 |
| 6,540,806 B1 | * 4/2003 | Reinhold | 55/490 |
| 6,599,342 B1 | * 7/2003 | Andress et al. | 55/495 |
| 6,652,614 B1 | * 11/2003 | Gieseke et al. | 55/498 |

FOREIGN PATENT DOCUMENTS

| | | |
|---|---|---|
| DE | 1 894 131 | 8/1963 |
| DE | 7400250 U | 1/1974 |
| DE | 26 26 008 A1 | 12/1976 |
| DE | 689 02 370 T2 | 3/1993 |
| EP | 0 348 905 A1 | 1/1990 |

\* cited by examiner

*Primary Examiner*—Minh-Chau T. Pham
(74) *Attorney, Agent, or Firm*—Stevens, Davis, Miller & Mosher, LLP

(57) ABSTRACT

In a housing for receiving an air filter element 1 with a housing bottom 2 and a housing top 3, the air filter element 1 within the housing can be positioned between the first carrier element 8 which is located on the housing bottom 2, and a second carrier element 9 which is located on the housing top 3, by means of the first carrier element 8 and/or the second carrier element 9 a seal being implemented between the raw air space 5 and the clean air space 6. The housing bottom 2 and the housing top 3 and also the two carrier elements 8, 9 of the housing can have different dimensions to match various types of internal combustion engines.

8 Claims, 2 Drawing Sheets

HOUSING FOR RECEIVING AN AIR FILTER ELEMENT

This invention relates to a housing for receiving an air filter element with a housing bottom and a housing top.

BACKGROUND OF THE INVENTION

DE 689 02 370 T2 discloses a set of component elements for forming a series of air filter housings for filtering the air supplied to the internal combustion engine of a commercial vehicle. This set comprises essentially two base elements and three different series of component elements with slightly different dimensions, said component elements being selectively attachable to the two base elements.

Furthermore, U.S. Pat. No. 2,480,379 discloses an air filter housing which is made such that it can be connected to different types of internal combustion engines by means of interchangeable intake elements and outlet elements.

By replacing certain elements in this prior art it is this possible to form different air filter housings which are suitable for use in vehicles with different dimensions and different engines. In this way the costs in the production and warehousing of the air filter housings can be clearly reduced.

SUMMARY OF THE INVENTION

Based on this prior art, the object of this invention is to devise an improved housing for receiving an air filter element. In doing so, especially the interchangeable component elements of the air filter housing which have different dimensions are to be made especially simple.

This object is achieved by a housing with the features of the claimed invention. By being able to position the air filter element within the housing, between the first carrier element which is located on the housing bottom, and a second carrier element which is located on the housing top, by means of the first carrier element and/or the second carrier element a seal or separation being implemented between the raw air space and the clean air space, different air filter elements with different dimensions can be held in a uniform housing which has been formed from a housing bottom and a housing top. The two carrier elements are made flat and relatively small so that production and warehousing of the air filter housing as claimed in the invention are far simpler and therefore also far more economical than in the prior art.

The first carrier element is formed advantageously as an essentially circular disk with one sealing lip respectively on the top and on the bottom. The two sealing lips on the one hand facilitate positioning of the first carrier element on the housing bottom, and on the other hand accomplish the seal between the raw air space and the clean air space. The circular first carrier element is especially stable here as a result of its shaping, so that the air filter element which is to be received in the housing can be held clamped in it.

Likewise, the second carrier element is advantageously made as an essentially annular disk with one sealing lip respectively on the top and on the bottom. Consequently, positioning is facilitated and sealing is achieved as in the first carrier element. The annular second carrier element moreover forms a connecting opening between the interior of the tubular air filter element and the interior of the dome-like housing top.

Alternatively to the sealing lips, the two carrier elements however could also be welded or cemented to the housing bottom and/or the housing top in order to achieve sealing.

If an air guide element is molded onto the second carrier element, the filtered air flowing into the housing top from the air filter element through the connecting opening can be guided in the desired manner so that flow resistance within the housing is reduced.

If the second carrier element in the area of its connecting opening bears an air mass measuring instrument, the latter is optimally positioned there. Moreover, in th is way air mass measuring instruments of various dimensions can be easily positioned on the second carrier element within the air filter housing.

If necessary, the first and the second carrier element however can also be made reversed, i.e., the first carrier element is made as an annular disk and the second carrier element is made as a circular disk.

Preferably the air filter element which is to be received by the housing is made tubular, so that commercial, standardized air filter elements can be used. In these air filter elements the raw air side is located on the outside and the clean air side is located on the inside of their cylindrical jacket.

The housing bottom expediently has a lateral intake opening for the unfiltered air and the housing top has a lateral outlet opening for the filtered air. To increase flexibility and to save weight, the housing bottom moreover has a central opening which can be closed or covered by means of the first circular carrier element, or if the first carrier element located on the housing bottom is made annular, it can be used as the intake or outlet opening for the filtered air. If the second carrier element located in the housing top is made circular, the passage to the lateral intake and outlet opening in the housing top can also be covered or closed.

To facilitate positioning of air filter elements of different structural height within the housing, the housing top has a support shoulder which runs around the periphery on the wall side. On this support shoulder the second carrier element can rest with its sealing lip, between the raw air space and the clean air space a seal being obtained which is not adversely affected by the outlet opening which is located above the support shoulder laterally in the housing top.

BRIEF DESCRIPTION OF THE DRAWINGS

This invention is detailed with reference to the following drawings, in which.

DETAILED DESCRIPTION OF THE INVENTION

Figure 1:
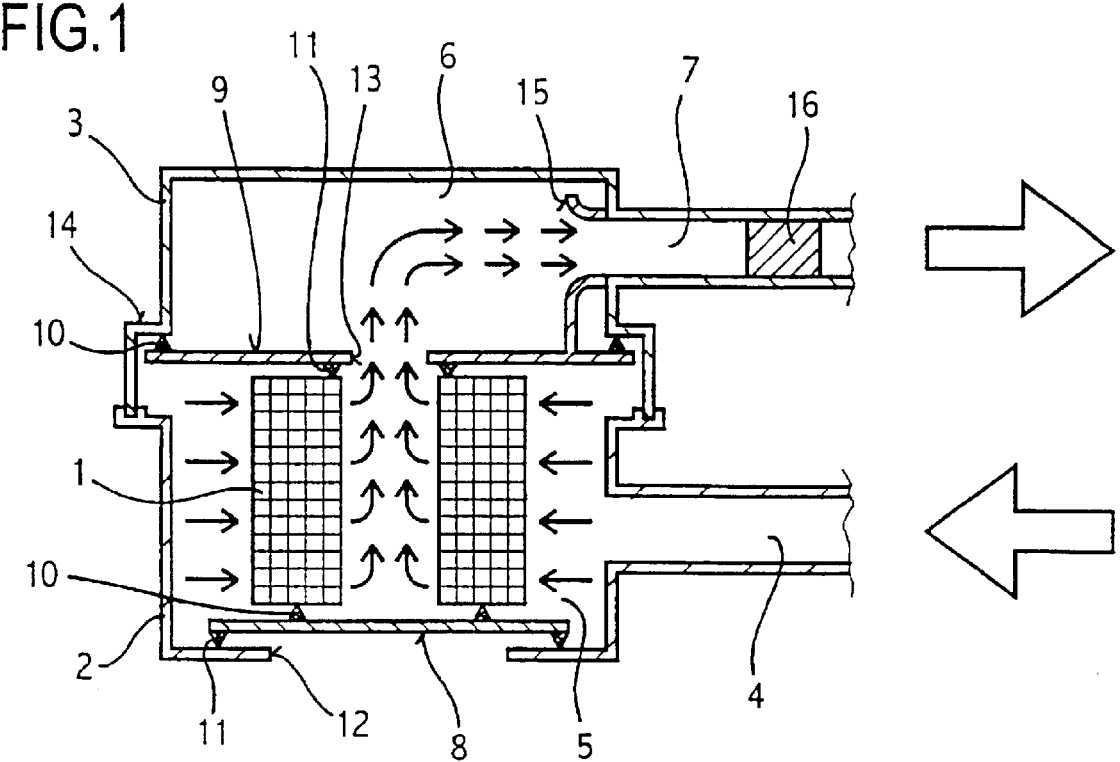
FIG. 1 shows a housing for receiving an air filter element with two carrier elements according to a first embodiment.

The housing for receiving the tubular air filter element 1 comprises a trough-shaped housing bottom 2 and a dome-like housing top 3 which corresponds to it.

The unfiltered air travels through a lateral intake opening 4 in the housing bottom 2 into the raw air space 5 within the housing. From there the unfiltered air enters on the outside raw air side of the air filter element 1 and emerges as filtered air on the inside clean air side of the air filter element 1. Thereupon the air which is in the clean air space 6 within the housing is supplied by the lateral outlet opening 7 in the housing top 3 to the intake manifold of an internal combustion engine which is not shown.

To position the air filter element 1 in the housing bottom 2 or in the housing top 3 and for sealing of the raw air space 5 relative to the clean air space 6, there are two carrier elements 8, 9.

Figure 2:
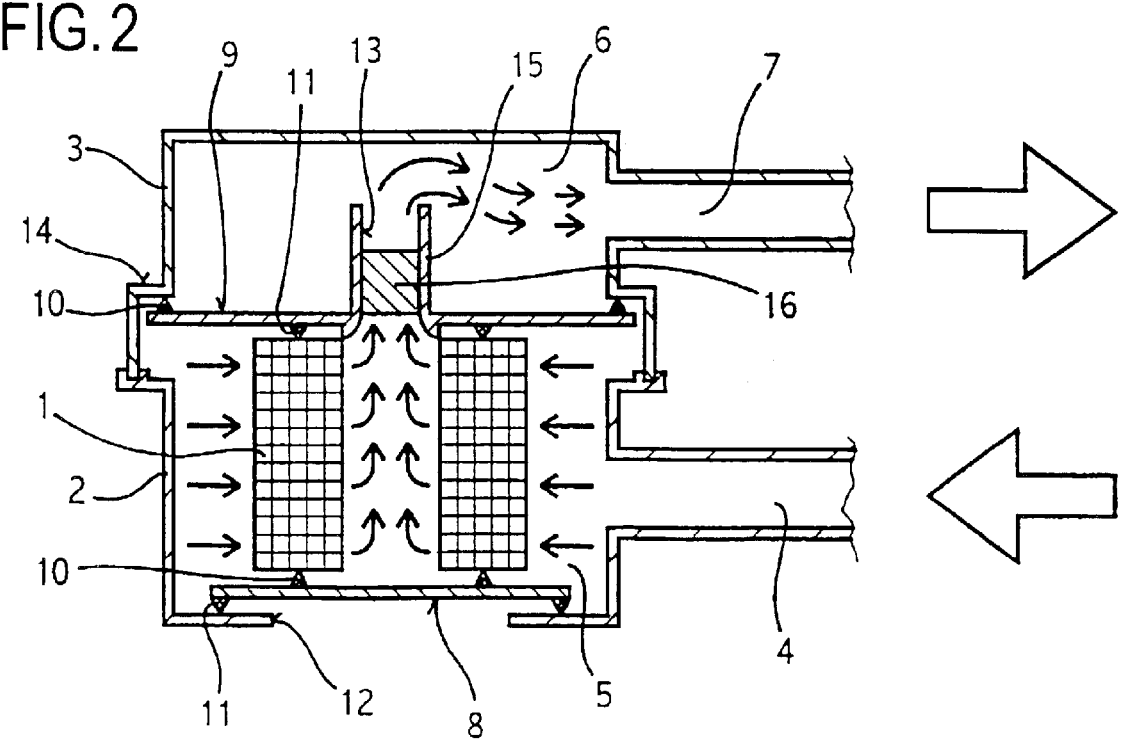
FIG. 2 shows the housing according to a second embodiment.

According to FIGS. 1 and 2, the first carrier element 8 which is located on the housing bottom 2 is made as an essentially circular flat disk with one sealing lip 10, 11 each on the top and on the bottom. This first carrier element 8 seals and/or covers the central opening 12 of the housing bottom 2. The two sealing lips 10, 11 adjoin the lower end face of the air filter element 1 or the housing bottom 2. And the second carrier element 9 which is located on the housing top 3 is made as an essentially annular flat disk with one sealing lip 10, 11 respectively on the top and bottom and a middle connecting opening 13. The second carrier element 9 rests on a support shoulder 14 of the housing top 3, which shoulder runs peripherally on the wall side.

The two sealing lips 10, 11 adjoin the support shoulder 14 of the housing top 3 or the upper end face of the air filter element 1 and the connecting opening 13 enables passage of the air which has been filtered by the air filter element 1 into the housing top 3.

In the first and in the second embodiment from FIGS. 1 and 2, the raw air space 5 extends essentially within the housing bottom 2 and the clean air space 6 extends essentially within the housing cover 3, separation of these two spaces 5, 6 being accomplished by the air filter element 1 and by the annular second carrier element 9.

In FIG. 1 moreover a funnel-shaped air guide element 15 is molded laterally on the second carrier element 9. This air guide element 15 facilitates the emergence of filtered air from the clean air space within the housing top 3 through the outlet opening 7 of the housing cover 3 to the intake manifold of the internal combustion engine.

And in FIG. 2 on the second carrier element 9 conversely a tubular air guide element 15 is molded. This air guide element 15 adjoins the connecting opening 13 of the second carrier element 9 which is made as an annular disk and bears an air mass measuring device 16 in its interior.

Figure 3:
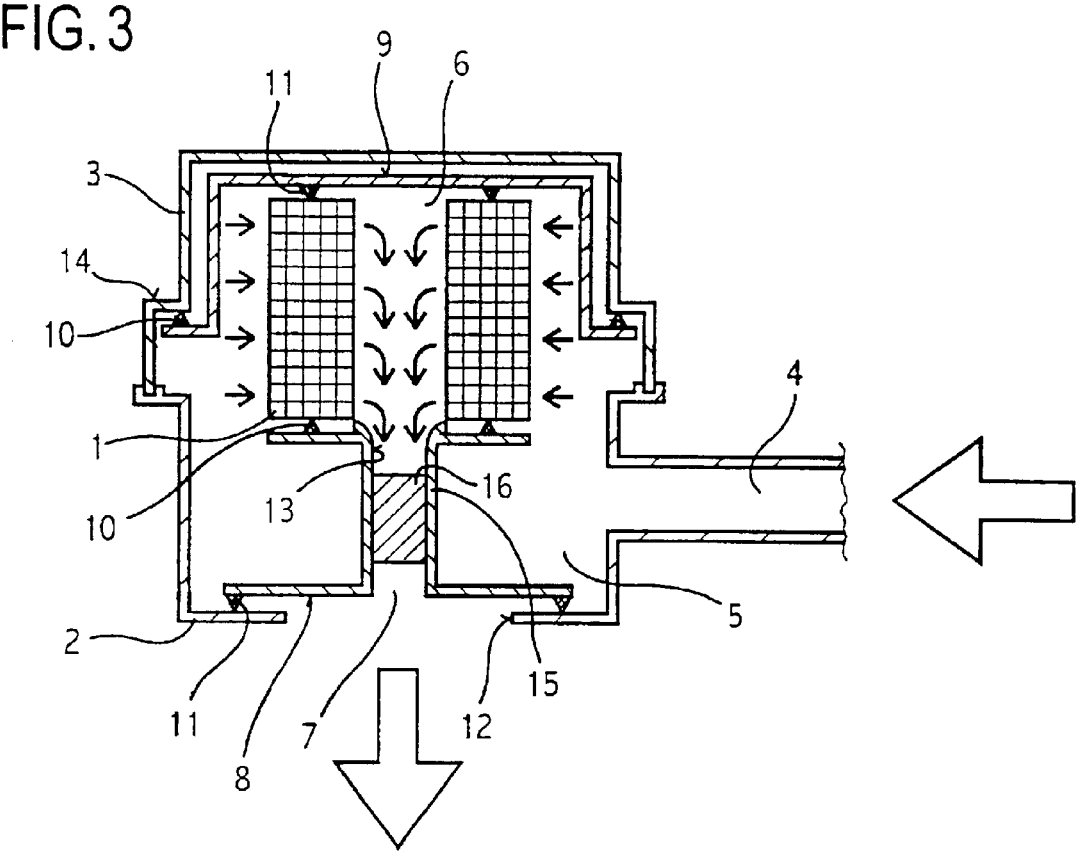
FIG. 3 shows the housing according to a third embodiment.

In the third embodiment as shown in FIG. 3, the raw air space 5 extends both within the housing bottom 2 and also within the housing top 3, while the clean air space 6 extends essentially within the tubular air filter element 1 and within the first carrier element 8 which is located on the housing bottom 2. Accordingly the filtered air in this third embodiment is not supplied to the intake manifold of the internal combustion engine through the outlet opening 7 in the housing top 3, but through the central opening 12 in the housing bottom 2.

The first carrier element 8 which is located on the housing bottom 2 is made as a type of spacer with two parallel annular disks and a tubular air guide element 15 which is located in between, the two sealing lips 10, 11 adjoining the lower end face of the air filter element 1 or the housing bottom 2. Within the tubular air guide element 15 there is in turn an air mass measuring device 16. The second carrier element 9 which is located on the housing top 3 in this third embodiment is conversely made pot-shaped, the two sealing lips 10, 11 adjoining the support shoulder 14 of the housing cover 3 or the top end face of the air filter element 1 so that in this way the lateral outlet opening 7 of the housing top 3 is closed.

What is claimed is:

1. A filter assembly comprising:

first and second housing sections connectable along mutually longitudinal centerlines to form a housing having an inlet and an outlet, at least one of said sections being selected from a group of sections having different longitudinal dimensions;

a filter element disposed in said housing between said inlet and outlet;

a first carrier member disposed between said housing and said filter element, having first sealing means disposed between said carrier member and said housing, and second sealing means disposed between said carrier member and said filter; and a second carrier member disposed between said housing and said filter element, having first sealing means disposed between said second carrier member and said housing, and second sealing means disposed between said second carrier member and said filter element and an opening communicating with an outlet side of said filter element;

wherein said second carrier member cooperates with said housing, said filter element and said first carrier member to define a first chamber intercommunicating said air inlet and an inlet side of said filter element, and a second chamber intercommunicating an outlet side of said of said filter element and said air outlet, through said opening in said second carrier member.

2. An assembly according to claim 1 wherein said first carrier member comprises a circular disc having said sealing means thereof disposed on opposite sides thereof.

3. An assembly according to claim 1 wherein said second carrier member comprises an annular member having said sealing means thereof disposed on opposite sides thereof.

4. An assembly according to claim 3 including an air mass measuring device disposed in the opening of said second carrier member.

5. An assembly according to claim 1 wherein said filter element has a tubular configuration.

6. An assembly according to claim 1 wherein said first housing section includes said air intake and said second housing section includes said air outlet.

7. An assembly according to claim 1 wherein one of said housing sections is provided with a peripheral surface, and the other of said housing sections is provided with a peripheral surface engageable with said first mentioned peripheral surface.

8. An assembly according to claim 1 wherein said housing sections are provided with cup-shaped configurations.

* * * * *